US010087330B2

(12) United States Patent
Green et al.

(10) Patent No.: US 10,087,330 B2
(45) Date of Patent: Oct. 2, 2018

(54) MESOPOROUS CARBON BLACK AND PROCESSES FOR MAKING SAME

(75) Inventors: Martin C. Green, Boxborough, MA (US); Roscoe Taylor, Andover, MA (US); Geoffrey D. Moeser, Reading, MA (US); Agathagelos Kyrlidis, Malden, MA (US); Raymond M. Sawka, Westford, MA (US)

(73) Assignee: Cabot Corporation, Boston, MA (US)

( * ) Notice: Subject to any disclaimer, the term of this patent is extended or adjusted under 35 U.S.C. 154(b) by 1179 days.

(21) Appl. No.: 12/378,260

(22) Filed: Feb. 12, 2009

(65) Prior Publication Data

US 2009/0208751 A1    Aug. 20, 2009

Related U.S. Application Data

(60) Provisional application No. 61/029,873, filed on Feb. 19, 2008.

(51) Int. Cl.
| | |
|---|---|
| *B32B 5/16* | (2006.01) |
| *C09C 1/56* | (2006.01) |
| *B82Y 30/00* | (2011.01) |
| *C01B 3/12* | (2006.01) |
| *C09D 11/324* | (2014.01) |

(Continued)

(52) U.S. Cl.
CPC ............. *C09C 1/565* (2013.01); *B82Y 30/00* (2013.01); *C01B 3/12* (2013.01); *C09D 11/324* (2013.01); *C10J 3/54* (2013.01); *H01G 9/0029* (2013.01); *H01G 11/24* (2013.01); *H01G 11/34* (2013.01); *H01M 4/926* (2013.01); *C01P 2004/64* (2013.01); *C01P 2006/12* (2013.01); *C01P 2006/14* (2013.01); *C01P 2006/42* (2013.01);

(Continued)

(58) Field of Classification Search
None
See application file for complete search history.

(56) References Cited

U.S. PATENT DOCUMENTS

| | | | |
|---|---|---|---|
| 3,411,928 A | 11/1968 | Dollinger et al. | |
| 3,615,209 A | 10/1971 | Whittaker et al. | |

(Continued)

FOREIGN PATENT DOCUMENTS

| | | |
|---|---|---|
| EP | 0371745 | 11/1989 |
| EP | 0 890 549 A1 | 1/1999 |

(Continued)

OTHER PUBLICATIONS

Hu, Z., Srinivasan, M.P., Ni, Y. "Novel activation processes for preparing highly microporous and mesoporous activated carbons." Carbon 39 (2001): 877-886.*

(Continued)

*Primary Examiner* — Ronak C Patel
*Assistant Examiner* — Thomas A Mangohig

(57) ABSTRACT

The invention is directed to processes for increasing the surface area of a carbon black starting material and for forming mesoporous carbon black. The process includes the step of contacting a carbon black starting material having a first BET nitrogen surface area with an oxidant in a fluidized bed under conditions effective to form a carbon black product having a second BET nitrogen surface area greater than the first BET nitrogen surface area. The invention is also directed to carbon black product formed by this process.

34 Claims, 6 Drawing Sheets

(51) Int. Cl.

| | | |
|---|---|---|
| *C10J 3/54* | (2006.01) | |
| *H01G 9/00* | (2006.01) | |
| *H01G 11/34* | (2013.01) | |
| *H01M 4/92* | (2006.01) | |
| *H01G 11/24* | (2013.01) | |
| *C08K 3/04* | (2006.01) | |
| *C09D 11/02* | (2014.01) | |
| *H01G 9/022* | (2006.01) | |
| *H01M 4/86* | (2006.01) | |

(52) U.S. Cl.
CPC ....... *C10J 2300/0973* (2013.01); *Y02E 60/13* (2013.01); *Y10T 428/2982* (2015.01)

(56) References Cited

U.S. PATENT DOCUMENTS

| | | | |
|---|---|---|---|
| 3,684,763 A | 8/1972 | Frazier | |
| 3,940,344 A | 2/1976 | Yokogawa et al. | |
| 3,951,856 A | 4/1976 | Repik et al. | |
| 3,959,008 A * | 5/1976 | Warner et al. | 106/478 |
| 4,136,059 A * | 1/1979 | Jalan et al. | 502/101 |
| 4,186,110 A | 1/1980 | Jalan et al. | |
| 4,202,934 A | 5/1980 | Jalan | |
| 4,263,268 A | 4/1981 | Knox et al. | |
| 4,316,944 A | 2/1982 | Landsman et al. | |
| 4,366,138 A | 12/1982 | Eisenmenger et al. | |
| 4,631,180 A * | 12/1986 | Yoshimura et al. | 423/450 |
| 5,068,161 A | 11/1991 | Keck et al. | |
| 5,171,774 A | 12/1992 | Ueno et al. | |
| 5,260,855 A | 11/1993 | Kaschmitter et al. | |
| 5,554,739 A | 9/1996 | Belmont | |
| 5,556,824 A * | 9/1996 | Sudhakar et al. | 502/202 |
| 5,707,432 A | 1/1998 | Adams et al. | |
| 5,837,045 A | 11/1998 | Johnson et al. | |
| 5,851,280 A | 12/1998 | Belmont et al. | |
| 5,885,335 A | 3/1999 | Adams et al. | |
| 5,895,522 A | 4/1999 | Belmont et al. | |
| 5,900,029 A | 5/1999 | Belmont et al. | |
| 5,922,118 A | 7/1999 | Johnson et al. | |
| 6,042,643 A | 3/2000 | Belmont et al. | |
| 6,297,408 B1 | 10/2001 | Haas et al. | |
| 6,337,358 B1 | 1/2002 | Whitehouse et al. | |
| 7,022,642 B2 | 4/2006 | Yamamoto | |
| 7,098,163 B2 | 8/2006 | Hampden-Smith et al. | |
| 7,160,615 B2 | 1/2007 | Iwaida et al. | |
| 2002/0009626 A1 | 1/2002 | Terazono et al. | |
| 2002/0015888 A1 | 2/2002 | Omaru et al. | |
| 2002/0037039 A1 | 11/2002 | Sugahara | |
| 2002/0189498 A1 * | 12/2002 | Nguyen et al. | 106/472 |
| 2003/0180210 A1 | 9/2003 | Karl | |
| 2006/0000071 A1 | 1/2006 | Dandekar et al. | |
| 2006/0063872 A1 * | 3/2006 | Teachout et al. | 524/417 |
| 2006/0264561 A1 * | 11/2006 | Green et al. | 524/496 |
| 2007/0003822 A1 | 1/2007 | Kocha et al. | |
| 2007/0160899 A1 | 7/2007 | Atanassova et al. | |
| 2008/0075842 A1 | 3/2008 | Brewster et al. | |
| 2008/0206616 A1 | 8/2008 | Atanassova et al. | |
| 2008/0299431 A1 | 12/2008 | Lei et al. | |

FOREIGN PATENT DOCUMENTS

| | | |
|---|---|---|
| EP | 1494304 | 1/2005 |
| EP | 1 453 898 B1 | 6/2005 |
| GB | 800975 | 9/1958 |
| GB | 1083482 | 9/1967 |
| JP | 54112952 | 9/1979 |
| JP | S5589361 A | 7/1980 |
| JP | 61066759 | 4/1986 |
| JP | S6254764 | 3/1987 |
| JP | H03101057 | 4/1991 |
| JP | 06196174 | 7/1994 |
| JP | 2000273351 | 10/2000 |
| JP | 2002308613 | 10/2002 |
| JP | 2003234104 | 8/2003 |
| WO | 0063306 | 10/2000 |
| WO | WO 2002/088258 | 11/2002 |
| WO | WO 2006/124773 | 11/2006 |
| WO | WO 2007/053563 | 5/2007 |
| WO | 2009105076 | 8/2009 |

OTHER PUBLICATIONS

Thomas, W.J., "Effect of Oxidation on the Pore Structure of Some Graphitized Carbon Blacks," Carbon, 1966, vol. 3, pp. 435-443.

Wang, L., et al., "Relationship between Pore Surface Area and Electric Double Layer Capacitance in Non-Aqueous Electrolytes for Air-Oxidized Carbon Spheres," Electrochimica Acta 51 (2006) pp. 4096-4102.

X. Zheng, S. Zhang, J. Xu, K. Wei, Effect of thermal and oxidative treatments of activated carbon on its surface structure and suitability as a support for bariumpromoted ruthenium in ammonia synthesis catalysts, Carbon 2002, 40, 2597-2603.

* cited by examiner

MESOPOROUS CARBON BLACK AND PROCESSES FOR MAKING SAME

CROSS-REFERENCE TO RELATED APPLICATION

This application claims priority to Provisional Application Ser. No. 61/029,873 filed Feb. 19, 2008, the entirety of which is incorporated herein by reference.

BACKGROUND OF THE INVENTION

Field of the Invention

The present invention relates to carbonaceous materials. In particular, the invention relates to mesoporous carbon black and processes for making mesoporous carbon black.

Discussion of Background Information

Mesoporous carbon black is carbon black having an average pore size that is greater than 2 nm, but less than the average primary particle size ($D_p$) of the carbon black. Mesoporous carbon black typically has a higher surface area than microporous carbon black, i.e., carbon black having an average pore size less than 2 nm.

Porosity in carbon black can be achieved via several methods. One common way of increasing the porosity of furnace blacks is to increase the residence time in the carbon black reactor, allowing the tail gas additional time to attack and etch the carbon surface. Another method is to add alkali earth metal ions to the carbon black feedstock, as these ions are known to catalyze the etching of the carbon black via the tail gas. Both of these techniques involve etching the carbon black "in-situ," i.e., in the furnace reactor during production to create carbon blacks with internal porosity. The main limitations of extending the residence time in the carbon black reactor are the physical length of the reactor and the temperature; carbon black reactors are generally not long enough to obtain very high levels of porosity. In addition, at lower reactor temperatures (which may be used to make larger primary particles) the etching rate is not sufficiently fast. A limitation of adding alkali earth metal ions is that it will leave behind impurities on the carbon black, which could be undesired in some applications. Another major limitation of both these in-situ etching techniques is that, to date, they favor formation of microporous carbon black rather than mesoporous carbon black. To date, there is no known way of using traditional carbon black furnace reactors to generate highly mesoporous carbon black.

Some degree of mesoporosity exists in certain competitive carbon blacks made via a gasification process, where carbon black is a byproduct of the reaction (for example, Ketjen EC600, Ketjen EC300, or Printex XE-2). These products have significant mesoporosity but because of other factors related to the gasification process, the base morphology (i.e., primary particle diameter and aggregate diameter) that can be made via this process appears to be rather limited. These products typically have primary particle sizes $D_p$ that are less than 30 nm. In addition, the structure of carbon black particles formed in the gasification process is generally high, meaning that the fractal carbon black aggregates contain large numbers of primary particles.

Thus, the need exists for processes for making mesoporous carbon black that also provide the ability to carefully control morphology (i.e. both primary particle and aggregate size). In addition, the need exists for mesoporous carbon black having pore and morphology characteristics different from carbon black that is formed by conventional gasification processes.

SUMMARY OF THE INVENTION

In one embodiment, the invention is directed to a process for increasing carbon black surface area, comprising contacting a carbon black starting material having a first BET nitrogen surface area with an oxidant in a fluidized bed under conditions effective to form a carbon black product having a second BET nitrogen surface area greater than the first BET nitrogen surface area, e.g., by a factor of at least about 1.5 such as from about 1.5 to about 8.0. Preferably, the process further comprises fluidizing the carbon black starting material in the fluidized bed with a fluidizing agent comprising the oxidant. The fluidizing agent optionally has a superficial velocity in the fluidized bed of from about 0.03 to about 0.15 m/s.

Optionally, the oxidant comprises steam. The conditions optionally comprise a reaction time of from about 0.5 to about 15 hours.

The fluidizing agent optionally comprises nitrogen in addition to an oxidant. In various other optional embodiments, the fluidizing agent comprises, consists essentially of, or consists of steam.

Preferably, the carbon black starting material comprises pelletized carbon black, which provides desirable fluidization characteristics.

In the process, the mass ratio of cumulative oxidant at the end of the reaction time to carbon black starting material optionally is from about 0.5 to about 2.5.

The conditions optionally comprise employing a fluidized bed temperature of from about 700° C. to about 1300° C., e.g., from about 900° C. to about 1100° C.

The ratio of steam flow to carbon black starting material in the fluidized bed optionally is from about 0.05 to about 0.50 kg steam/kg carbon black starting material/hour.

In another embodiment, the invention is to a carbon black product formed by a process comprising the step of contacting a carbon black starting material having a first BET nitrogen surface area with an oxidant in a fluidized bed under conditions effective to form the carbon black product having a second BET nitrogen surface area greater than the first BET nitrogen surface area. The carbon black starting material preferably is fluidized in the fluidized bed with a fluidizing agent comprising the oxidant.

In another embodiment, the invention is to a conductive plastic comprising carbon black product and a plastic, wherein the carbon black product is formed by a process comprising the step of contacting a carbon black starting material having a first BET nitrogen surface area with an oxidant in a fluidized bed under conditions effective to form the carbon black product having a second BET nitrogen surface area greater than the first BET nitrogen surface area. The carbon black starting material preferably is fluidized in the fluidized bed with a fluidizing agent comprising the oxidant.

In another embodiment, the invention is to an ink jet ink comprising carbon black product dispersed in a liquid vehicle, wherein the carbon black product is formed by a process comprising the step of contacting a carbon black starting material having a first BET nitrogen surface area with an oxidant in a fluidized bed under conditions effective to form the carbon black product having a second BET nitrogen surface area greater than the first BET nitrogen surface area. The carbon black starting material preferably is fluidized in the fluidized bed with a fluidizing agent comprising the oxidant.

In another embodiment, the invention is to a fuel cell catalyst comprising carbon black product and an active phase disposed thereon, wherein the carbon black product is formed by a process comprising the step of contacting a carbon black starting material having a first BET nitrogen surface area with an oxidant in a fluidized bed under conditions effective to form the carbon black product having a second BET nitrogen surface area greater than the first BET nitrogen surface area. The carbon black starting material preferably is fluidized in the fluidized bed with a fluidizing agent comprising the oxidant.

In another embodiment, the invention is to a supercapacitor comprising carbon black product, wherein the carbon black product is formed by a process comprising the step of contacting a carbon black starting material having a first BET nitrogen surface area with an oxidant in a fluidized bed under conditions effective to form the carbon black product having a second BET nitrogen surface area greater than the first BET nitrogen surface area. The carbon black starting material preferably is fluidized in the fluidized bed with a fluidizing agent comprising the oxidant.

In another embodiment, the invention is to porous carbon black, e.g., mesoporous carbon black, having (i) a BET nitrogen surface area of from about 600 to about 1200 m$^2$/g or from about 1500 to about 1800 m$^2$/g (e.g., from about 600 to about 900 m$^2$/g, from about 900 to about 1200 m$^2$/g or from about 1500 to about 1800 m$^2$/g), and (ii) a BET nitrogen surface area:STSA (statistical thickness surface area) ratio of from about 0.95 to about 1.1.

In another embodiment, the invention is to porous carbon black, e.g., mesoporous carbon black, having an average primary particle size of from about 35 to about 80 nm, a BET nitrogen surface area of from about 600 to about 1800 m$^2$/g, and a BET nitrogen surface area:STSA ratio of from about 0.95 to about 1.1.

In another embodiment, the invention is to porous carbon black, e.g., mesoporous carbon black, having a BET nitrogen surface area of from about 600 to about 1800 m$^2$/g and a $D_{agg}/D_p$ ratio of from about 1 to about 7, e.g., from about 1 to about 5, or from about 1 to about 3. The $D_p$ optionally is from about 35 to about 80 nm or from about 5 to about 15 nm. The porous carbon black optionally has a BET nitrogen surface area of from about 900 to about 1400 m$^2$/g and a $D_{agg}/D_p$ ratio of from about 1 to about 5, e.g., from about 1 to about 3. The porous carbon black optionally has a BET nitrogen surface area:STSA ratio of from about 0.95 to about 1.1.

In another embodiment, the invention is to porous carbon black having a total volume of pores between 2 and 5 m in size of from about 1.2 to about 2.0 cm$^3$/g as measured by nitrogen desorption.

In another embodiment, the invention is to porous carbon black having a total volume of pores between 2 and 100 nm in size of from about 3.0 to about 5.0 cm$^3$/g as measured by nitrogen desorption.

BRIEF DESCRIPTION OF THE DRAWINGS

The present invention will be better understood in view of the following non-limiting figures, wherein.

DETAILED DESCRIPTION OF THE INVENTION

Introduction

Figure 1:
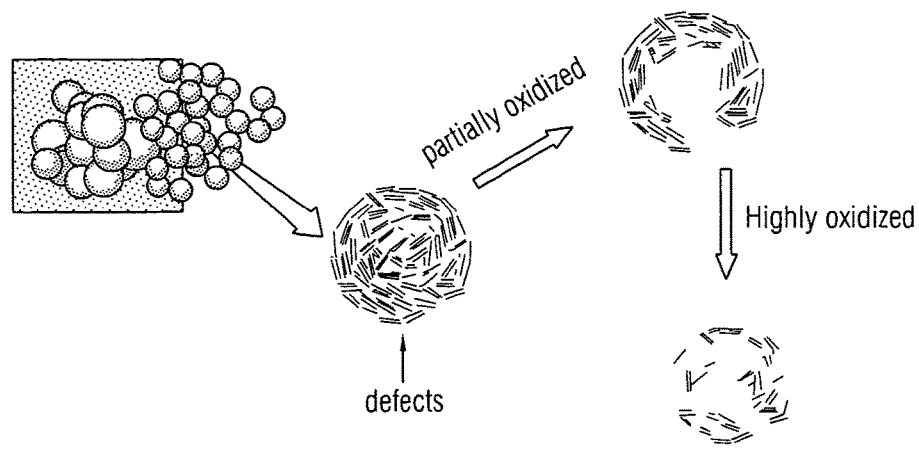
FIG. 1 illustrates how carbon surface area increases through steam etching by the removal of lattice defects.

The present invention, in one aspect, is directed to a process for increasing carbon black surface area by oxidizing a carbon black starting material with an oxidant in a fluidized bed reactor to increase its surface area, and preferably form a mesoporous carbon black product. For example, in one embodiment, the invention is to a process that comprises the step of contacting a carbon black starting material having a first BET nitrogen surface area with an oxidant, e.g., steam, in a fluidized bed under conditions effective to form a carbon black product having a second BET nitrogen surface area greater than the first BET nitrogen surface area. In a preferred embodiment, the process further comprises the step of fluidizing the carbon black starting material in the fluidized bed with a fluidizing agent comprising the oxidant and optionally a diluent such as nitrogen. The invention is also directed to various carbon black products manufactured by this process. As used herein, the term "BET nitrogen surface area" means the surface area as determined by ASTM D6556-04, the entirety of which is incorporated herein by reference.

Carbon Black Starting Material

As indicated above, the invention, in one aspect, is directed to increasing the surface area of a carbon black starting material. The physical properties of the carbon black starting material may vary widely, but preferably the carbon black is in a form that renders it suitable for fluidization in a fluidized bed reactor. The morphology, size, physical form, and mass of the carbon black starting material will depend, for example, on the specific fluidization conditions employed, e.g., the superficial velocity of the fluidizing agent, design of the fluidization plate, etc.

In a preferred embodiment, the carbon black starting material comprises pelletized carbon black. Pelletized carbon black has been found to exhibit desirable fluidization characteristics for the processes of the present invention. Any of a variety of conventional carbon black pelletization techniques may be employed to pelletize a non-pelletized carbon black material and form a pelletized carbon black starting material. For example, pellets can be formed via wet pelletization, in which fine carbon black powder is fed to a pin mixer with water and then mixed under high shear.

Polymeric or small molecule binders can also be added to the water to improve pellet hardness or durability. Another method of pelletizing is dry pelletization, in which fine carbon black powder is fed to a large rotary drum where it is mixed with recycled (or seed) pellets, and the rotating action of the drum causes the fine powder to mix and incorporate with the pellets.

In some exemplary embodiments, the carbon black starting material, e.g., pelletized carbon black starting material, has an average pellet size greater than about 25 µm, e.g., greater than about 50 µm, greater than about 100 µm, greater than about 200 µm, greater than about 500 µm, or greater than about 1 mm. In terms of ranges, the carbon black starting material, e.g., pelletized carbon black starting material, optionally has an average pellet size of from about 10 µm to about 5 mm, e.g., from about 100 µm to about 5 mm, or from about 200 µm to about 2 mm. The carbon black starting material optionally has a pellet size distribution with 0% to 3% by weight greater than 2 mm, 15% to 80% by weight between 1 and 2 mm, 15% to 80% by weight between 500 µm and 1 mm, 1% to 15% by weight between 250 µm and 500 um, 0% to 10% by weight between 125 µm and 250 µm, and 0% to 5% by weight less than 125 µm. In this context, the pellet size distribution and average pellet size is determined by passing the carbon black pellets through a vibrating series of stacked sieves with decreasing mesh size and then measuring the mass collected on each sieve as per ASTM D1511-00, the entirety of which is incorporated herein by reference.

Preferably, the carbon black starting material is substantially free of carbon black fines, defined herein as the fraction of carbon black particles passing through a #120 mesh sieve, e.g., having a pellet size less than about 125 µm, which tend to exhibit poor fluidization characteristics. In various optional embodiments, the carbon black starting material comprises less than about 15 weight percent carbon black fines, e.g., less than about 10 weight percent, less than about 5 weight percent or less than about 2 weight percent carbon black fines.

The first BET nitrogen surface area (also called $N_2SA$) of the carbon black starting material similarly may vary widely. In various optional embodiments, the first BET nitrogen surface area is less than about 1000 m$^2$/g, e.g., less than about 500 m$^2$/g, less than about 300 m$^2$/g, or less than about 100 m$^2$/g.

The average primary particle size ($D_p$) as determined by ASTM D3849-04 (also called the ASTM particle size), the entirety of which is incorporated herein by reference, of the carbon black starting material optionally is less than about 100 nm, e.g., less than about 75 nm, less than about 50 nm, less than about 30 nm, less than about 20 nm, or less than about 10 nm. In terms of ranges, the average primary particle size of the carbon black starting material optionally is from about 5 nm to about 100 nm, e.g., from about 10 to about 50 nm, from about 10 nm to about 40 nm, from about 10 nm to about 30 nm or from about 10 nm to about 20 nm.

Carbon black aggregates are defined as structures of primary carbon black particles that are fused at the contact points and cannot readily be separated by shearing. The average aggregate size ($D_{agg}$) of the carbon black starting material may be extracted from TEM image analysis using the imaging technique described in ASTM D3849-04, the entirety of which is incorporated herein by reference, and then specifically based on the following equation:

$$D_{agg}=(D_{max}D_{min})^{0.5}$$

where $D_{max}$ is the arithmetic number average maximum diameter of the particles from TEM analysis, and $D_{min}$ is the arithmetic number average minimum diameter of the particles from TEM analysis. In some exemplary embodiments, the carbon black starting material has an average aggregate size that is less than about 500 nm, e.g., less than about 400 nm, less than about 300 nm, less than about 200 nm, or less than about 100 nm. In terms of ranges, the average aggregate particle size of the carbon black starting material optionally is from about 30 nm to about 500 nm, e.g., from about 50 to about 300 nm, or from about 100 nm to about 300 nm.

The structure of the carbon black starting material may be characterized by the ratio of the average aggregate size to the average primary particle size ($D_{agg}/D_p$). The ratio of $D_{agg}/D_p$ for the carbon black starting material optionally ranges from about 1 to about 12, e.g., from about 2 to about 10 or from about 4 to about 10, with a higher number indicating a greater structure. In terms of lower range limitations, the ratio of $D_{agg}/D_p$ for the carbon black starting material optionally is greater than about 4, e.g., greater than about 7 or greater than about 11.

The bulk density of the carbon black starting material may have a significant impact on the fluidization characteristics of the carbon black starting material. In some exemplary embodiments, the bulk density of the carbon black starting material, e.g., pelletized carbon black starting material, optionally is from about 150 to about 500 kg/m$^3$, e.g., from about 200 to about 450 kg/m$^3$, or from about 250 to about 450 kg/m$^3$.

The degree of mesoporosity vs. microporosity of highly etched carbon black may be characterized by the ratio of the BET nitrogen surface area to statistical thickness surface area (STSA). BET nitrogen surface area generally reflects the total surface area of the carbon black, i.e., including the external surface area and surface area attributable to mesopores and micropores, while STSA surface area generally reflects only the external surface area and the surface area of the carbon black that is attributable to mesopores (i.e., excluding surface area attributable to micropores). As used herein, the term "STSA Surface Area" means the surface area as determined as per ASTM D6556-04, the entirety of which is incorporated herein by reference. Generally, the more similar the BET nitrogen and STSA surface areas (i.e., as the ratio approaches 1), the less microporous the carbon black. In some exemplary embodiments, the carbon black starting material has a BET nitrogen surface area/STSA ratio that is greater than 0.9, e.g., greater than about 1.1, greater than about 1.3, or greater than about 1.5. During the oxidizing process of the present invention, microporosity (and hence the BET nitrogen surface area/STSA ratio) may initially increase, but ultimately will decrease as the microporous structure is oxidized and the carbon black particles are "hollowed out," as described below with reference to FIG. 1 and FIG. 8. During the oxidation of the microporous structure, the BET nitrogen surface area/STSA ratio ideally approaches 1.

The primary particle and aggregate sizes of the carbon black product formed by the process of the present invention may be controlled by selecting a carbon black starting material with the appropriate morphology. Furnace carbon blacks are available in a wide range of primary particle and aggregate sizes. These carbon black starting materials optionally may be unetched, or may have been etched to some degree in situ (i.e., within the carbon black reactor). Other carbon blacks such as, for example, thermal blacks, acetylene blacks, lamp blacks, channel blacks, or gas furnace blacks may be employed as the carbon black starting materials.

In some specific non-limiting examples, the carbon black starting material comprises one or more carbon blacks selected from the group consisting of Vulcan XC72 (with or without binder), Black Pearls 700, Black Pearls 800, Vulcan XC605, Regal 350, Regal 250, Black Pearls 570, and Vulcan XC68.

Fluidizing Agent

The process preferably comprises a step of fluidizing the carbon black starting material in a fluidized bed with a fluidizing agent comprising an oxidant and optionally a diluent such as nitrogen.

The composition of the oxidant may vary widely depending, for example, on the composition of the carbon black starting material that is employed and on the desired reaction conditions. In some non-limiting embodiments, the oxidant comprises one or more of $O_2$, $O_3$, an oxygen-containing acid, water (e.g., steam), $NO_x$, $SO_3$ or $CO_2$. In some particularly preferred embodiments, the oxidant comprises, consists of, or consists essentially of steam. Preferably, the fluidizing agent comprises at least 50 wt. % steam, at least 75 wt. % steam, at least 90 wt. % steam or 100% steam. If the fluidizing agent consists essentially of the oxidizing agent, without a separate non-oxidizing fluidizing component, an additional benefit is that it is not necessary to purify the carbon black product or separate the fluidizing component from the carbon black product after the oxidizing step.

Optionally, the fluidizing agent further comprises a diluent, i.e., a material that is included in the fluidizing agent primarily for a reason other than to oxidize the carbon black starting material. For example, the diluent may comprise an inert gas, e.g., nitrogen or argon. Thus, the fluidizing agent optionally further comprises an inert gas, e.g., nitrogen or argon. During start up, the fluidizing agent may comprise the diluent and little or no oxidant. By employing a fluidizing agent containing diluent but little or no oxidant, the carbon black starting material may be fluidized with the diluent while the temperature profile of the fluidized bed reactor is adjusted (i.e., as the bed is heated) to make the reaction thermodynamically favorable. Once the desired temperature profile is achieved, the oxidant content of the fluidizing agent may be increased to provide the desired oxidant: diluent ratio and the reaction proceeds. A similar procedure may be employed for reactor shut-down.

Desirably, the oxidation rate (e.g., etching rate) of the process of the present invention may be carefully controlled by controlling the ratio of oxidant (e.g., steam) to diluent (e.g., nitrogen) in the fluidizing agent during the step of contacting the carbon black starting material with the oxidant in the fluidized bed under conditions effective to form the carbon black product. As a result, the second BET nitrogen surface area of the carbon black product formed according to the process of the present invention may be carefully controlled by controlling the ratio of oxidant (e.g., steam) to diluent (e.g., nitrogen) in the fluidizing agent.

Oxidizing Conditions

It has now been discovered that carbon black may be effectively oxidized to increase its surface area in a fluidized bed reactor. Fluidized bed reactors provide the benefit, as compared to other reactor types, of improving the contacting of the oxidant with the carbon black starting material, which leads to faster reaction times and more homogenous etching of the carbon black starting material in forming the carbon black product. In a preferred embodiment, the oxidizing comprises a steam-etching process. As used herein, the term "steam etching" means oxidizing the carbon black starting material with steam.

A fluidized bed reactor typically comprises a fluidizing agent introduction zone or plenum, and a reaction zone (etching zone) or bed disposed above the fluidizing agent introduction zone. During operation, the carbon black starting material is fluidized in the etching zone to form a fluidized bed. The two zones are preferably separated by a base grate, screen, plate, or similar separation structure, which comprises a plurality of openings to allow the fluidizing agent to flow from the fluidizing agent introduction zone to the etching zone (fluidized bed) while substantially eliminating flow of the carbon black starting material from the etching zone to the fluidizing agent introduction zone.

Without being bound by theory, the process of the invention is believed to increase surface area by removing, for example, active sites such as defects, amorphous carbon, single layer planes, etc., from the carbon black starting material. This process is illustrated in FIG. 1, which shows the removal of defects to form a highly oxidized, high surface area carbon black product. In FIG. 1, a primary particle (carbon black starting material) is depicted as having a concentric crystallite mode, which is represented by a "shell" that comprises larger, more perfect crystallites having layered planes that are oriented generally parallel to the particle surface. The center region or "core" of the particle comprises primarily small, imperfect crystallites, single-layer planes and possibly disorganized carbon that is not incorporated into the layered planes. In addition, there are some active sites (of higher energy) on the carbon surface such as defects, functional groups, etc. During the process of the invention, the oxidant molecules (e.g., water molecules) first attack the active sites on the carbon surface and remove the carbon atoms from the surface and forming gas phase CO or $CO_2$ and hydrogen (see equations 1-2, below), resulting in the exposure of more carbon atoms. Since the carbon atoms in the core of the particles tend to have higher energy than those on the surface, the oxidizing (e.g., etching) rates tend to be faster in the core of the particles than on the surface.

More specifically, for steam etching, again without being bound by theory, the carbon black starting material is converted to the carbon black product in a reaction mechanism that is similar to steam reforming. The products of steam etching comprise CO and hydrogen and/or $CO_2$ and hydrogen. The relative content of CO and $CO_2$ is dependent on the ratio of steam to carbon and temperature. For example, higher steam to carbon ratios favor $CO_2$ and hydrogen production. The relevant steam etching reactions are as follows:

$$C + H_2O \rightarrow CO + H_2 \tag{1}$$

$$CO + H_2O \rightarrow CO_2 + H_2 \tag{2}$$

If steam etching is employed as the oxidizing step, the steam etching preferably comprises fluidizing the carbon black starting material in a fluidized bed reactor with a fluidizing agent comprising steam. As indicated above, the fluidizing agent may comprise one or more additional components, e.g., an inert gas such as nitrogen or argon. By controlling the ratio of steam to diluent that is fed to the fluidized bed reactor, the degree of steam etching of the carbon black starting material desirably can be carefully controlled. The degree of steam etching of the carbon black can also be controlled by the ratio of steam flow rate to carbon, with higher steam flow rate to carbon ratios favoring greater etching.

The conditions employed in the fluidized bed reactor that are effective to form a carbon black product having a second BET nitrogen surface area greater than the first BET nitrogen surface area will vary depending on factors such as the physical properties of the carbon black starting material and, in particular, the fluidizability of the carbon black starting material. Additional factors impacting the desired conditions for the fluidized bed reactor include the fluidization plate design as well as the design of the fluidized bed reactor employed.

Another important parameter in controlling the rate and degree of oxidization in the fluidized bed reactor is the temperature of the fluidized bed. Generally, the greater the bed temperature, the faster the rate of oxidation will be. The steam etching process preferably takes place at a temperature greater than about 700° C. due to the highly endothermic nature of the reactions ($\Delta H_{300K}$=31.4 kcal/mol). In some non-limiting embodiments, the bed temperature is greater than about 700° C., e.g., greater than about 900° C. or greater than about 1000° C. In terms of ranges, the bed temperature optionally is from about 700° C. to about 1400° C., e.g., from about 700° C. to about 1300° C., e.g., from about 900° C. to about 1100° C. or from about 1000° C. to about 1100° C. As used herein, the term "bed temperature" means the average temperature of the bed during the step of contacting the carbon black starting material with the oxidant, e.g., steam, in the fluidized bed under conditions effective to form the carbon black product.

The superficial velocity at which the fluidizing agent is introduced into the fluidized bed is another important factor in controlling the degree of contacting between the oxidant and the carbon black starting material. Ideally, the superficial velocity is sufficiently high so as to cause the carbon black contained in the fluidized bed to behave in a fluidized manner, but not so high as to entrain carbon black pellets or particles thereby carrying them out of the fluidized bed reactor. In some non-limiting embodiments, the fluidizing agent has a superficial velocity in the fluidized bed of from about 0.03 to about 0.15 m/s, e.g., from about 0.05 to about 0.13 m/s or from about 0.05 to about 0.10 nm/s.

The degree of oxidation of the carbon black starting material that is desired to form the carbon black product is generally proportional to the mass ratio of cumulative oxidant at the end of the reaction time to carbon black starting material. In some exemplary non-limiting embodiments, the mass ratio of cumulative oxidant at the end of the reaction time to carbon black starting material is from about 0.5 to about 3, e.g., from about 0.5 to about 2.5, from about 0.5 to about 2 or from about 1 to about 2. A similar parameter is the ratio of steam flow to carbon black starting material in the fluidized bed, which preferably is from about 0.05 to about 0.50 kg steam/kg carbon black starting material/hour, e.g., from about 0.1 to about 0.4 kg steam/kg carbon black starting material/hour, or from about 0.2 to about 0.3 kg steam/kg carbon black starting material/hour.

The reaction time employed in forming the carbon black product from the carbon black starting material will vary depending, for example, on the desired difference in surface area and porosity between the carbon black starting material and the carbon black product, the temperature of the fluidized bed reactor, the superficial gas velocity of the fluidizing agent, the oxidant content of the fluidizing agent, the mass loading of the carbon black staring material, and other parameters well within the knowledge of those skilled in the art of fluidized bed reaction processes. In some non-limiting embodiments, the conditions comprise a reaction time of from about 0.5 to about 24 hours, e.g., 0.5 to about 15 hours, from about 2 to about 12 hours or from about 3 to about 9 hours.

The degree of oxidation of the carbon black starting material that is desired as well as the reaction time will depend, among other things, on the desired difference between the second BET nitrogen surface area of the carbon black product and the first BET nitrogen surface area of the carbon black starting material. In some non-limiting exemplary embodiments, the conditions, e.g., one or more of the reaction time, the bed temperature, the oxidant content of the fluidizing agent, etc., are controlled such that the second BET nitrogen surface area is greater than the first BET nitrogen surface area by a factor of at least about 1.2, at least about 1.5, at least about 2.0, at least about 4.0, or at least about 8.0. In terms of ranges, the conditions optionally are controlled such that the second BET nitrogen surface area is greater than the first BET nitrogen surface area by a factor of from about 1.5 to about 8.0, e.g., from about 3.0 to about 8.0 or from about 5.0 to about 8.0. Optionally, the difference between the second BET nitrogen surface area and the first BET nitrogen surface area is greater than about 100 m$^2$/g, e.g., greater than about 200 m$^2$/g, greater than about 300 m$^2$/g, greater than about 400 m$^2$/g, greater than about 500 m$^2$/g, greater than about 800 m$^2$/g, greater than about 1000 m$^2$/g or even greater than about 1200 m$^2$/g.

The oxidizing (e.g., steam etching) process is optionally performed at elevated pressure. The partial pressure of the oxidant (e.g., steam) employed in the oxidizing process, e.g., within the fluidized bed reactor, may vary over a wide range. Typically, the partial pressure employed in the process is in the range of from about 0.1 to about 1, e.g., from about 0.2 to about 0.8 or from about 0.3 to about 0.7 atmospheres.

Optionally, the process of the invention is conducted in the presence of a catalyst. If employed, the catalyst optionally comprises, for example, a metal oxide (such as, for example, NiO, CuO, Fe$_2$O$_3$), a metal nitrate (such as, for example, Ni(NO$_3$)$_2$, Cu(NiO$_3$)$_2$), or a metal hydroxide (such as, for example, Fe(OH)$_3$, NaOH, KOH and Ca(OH)$_2$), or an alkali earth metal salt (either with an organic anion or an inorganic anion) such as calcium acetate, calcium formate, calcium chloride, barium acetate, barium formate, or barium chloride. If a catalyst is employed, the weight ratio of catalyst to carbon optionally is from about 0.0001 to about 0.5, e.g., from about 0.001 to about 0.1 or from about 0.005 to about 0.05.

During the steam etching process, samples of the carbon black contained in the fluidized bed may be obtained and analyzed to determine if the desired increase in surface area has been achieved. In a preferred embodiment, a separation device such as a cyclone that is in fluid communication with the fluidized bed (e.g., through a conduit) periodically samples the carbon black contained therein. The etching level of a given sample can be estimated by manually measuring the oil absorption (i.e. DBP or dibutylphthalate absorption) number in terms of cc/100 g carbon black in a manner similar to that described in ASTM D2414-06a but using a manual (i.e. hand) mixing method rather than a machine. For example, a target manual oil absorption number between about 400 and about 750 cc/100 g may be desirable (this target number corresponds to a BET surface area for Vulcan XC72 carbon black of about 800 to about 1500 m$^2$/g). After the desired increase in surface area has been achieved, the resulting carbon black product is removed from the steam etching device, typically by stopping the flow of the fluidizing agent, allowing the bed to cool under flow of pure nitrogen or other inert gas, and then removing the carbon-containing material, for example, through the fluidizing agent introduction zone and through a product outlet that is in communication with the fluidizing agent introduction zone.

Figure 2:
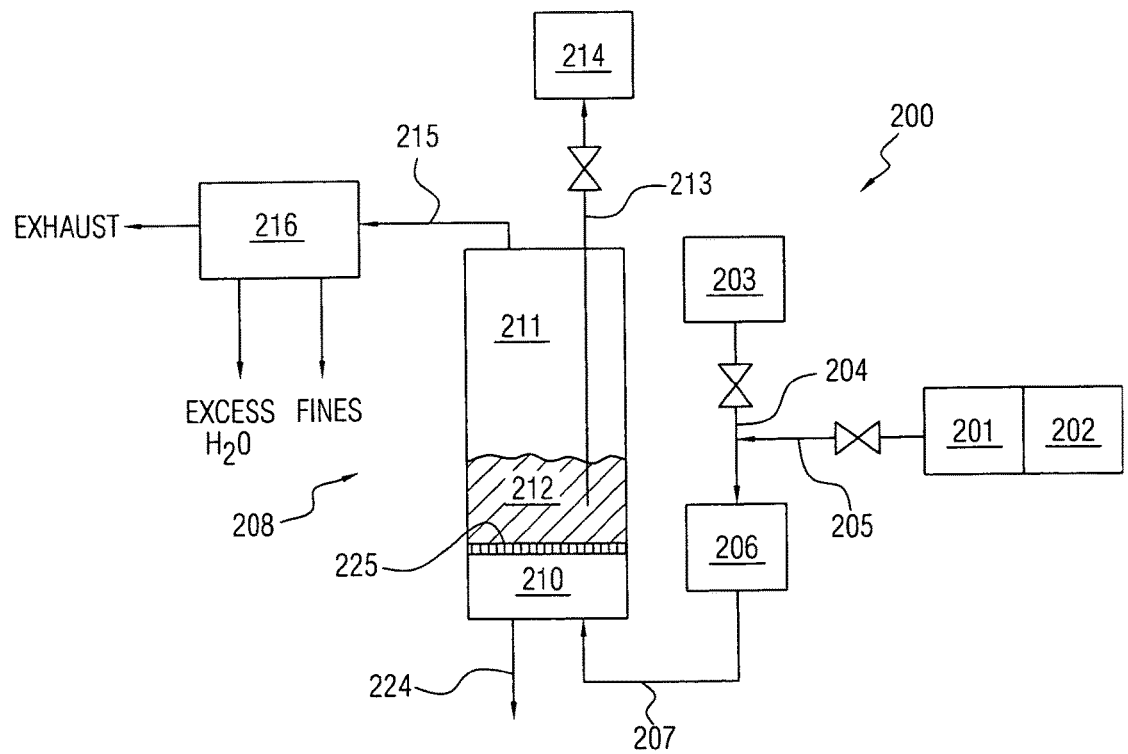
FIG. 2 presents a flow diagram of a fluidized bed reaction system in which fluidizing agent comprises steam and/or nitrogen according to one aspect of the present invention.

FIG. 2 provides a flow diagram of an exemplary steam-etching system 200 according to one embodiment of the present invention. Steam etching system 200 comprises a fluidized bed reactor 208, which comprises a fluidizing agent introduction zone or plenum 210 and an etching zone 211, which zones are separated from one another by base screen or grate 225. During normal operation, etching zone 211 includes a fluidized bed 212, which comprises the carbon black and optionally catalyst. The etching zone 211 preferably is heated by one or more heaters to provide the desired temperature profile.

As shown, the fluidizing agent comprises steam and/or a substantially inert fluidizing agent (e.g., $N_2$). The steam is provided by steam generator 201 (facilitated by pump 202), and the substantially inert fluidizing agent is provided by substantially inert fluidizing agent source 203. The substantially inert fluidizing agent and the steam (controlled by valves to provide the desired ratio) are directed through conduits 204 and 205, respectively, and combined prior to introduction into gas preheater 206, which preferably increases the temperature of the fluidizing agent prior to introduction into the fluidized bed reactor 208 in order to facilitate the steam etching process.

After preheating in gas preheater 206, the fluidizing agent is directed through conduit 207 to the fluidizing agent introduction zone or plenum 210. The positive pressure of the fluidizing agent being introduced into the fluidizing agent introduction zone or plenum 210 causes the fluidizing agent to pass through openings in the screen or grate 225 and enter the etching zone 211. As the fluidizing agent enters the etching zone 211, it fluidizes the carbon black and optional catalyst in fluidized bed 212. Additionally, as fluidizing agent enters the etching zone 211, excess steam, gaseous byproducts, and some amount of entrained fines are removed from the top of the steam etching device 208 through conduit 215 and directed to separation system 216, which may comprise one or more separation devices, e.g., cyclones, bag houses, filters, etc, in order to separate carbon black fines from the gaseous byproducts.

As shown, a sampling device 214 is in fluid communication with the fluidized bed 212 through conduit 213 and periodically samples the carbon black contained therein to determine if the desired degree of steam etching has been achieved. After the desired increase in surface area has been achieved, the resulting steam etched carbon black, i.e., carbon black product, is removed from the steam etching device by stopping the flow of the fluidizing agent, allowing the bed to cool under flow of pure nitrogen or other inert gas, and then removing the carbon black product through the fluidizing agent introduction zone 210 and through product outlet 224 that is in communication with the fluidizing agent introduction zone 210.

Figure 3A:
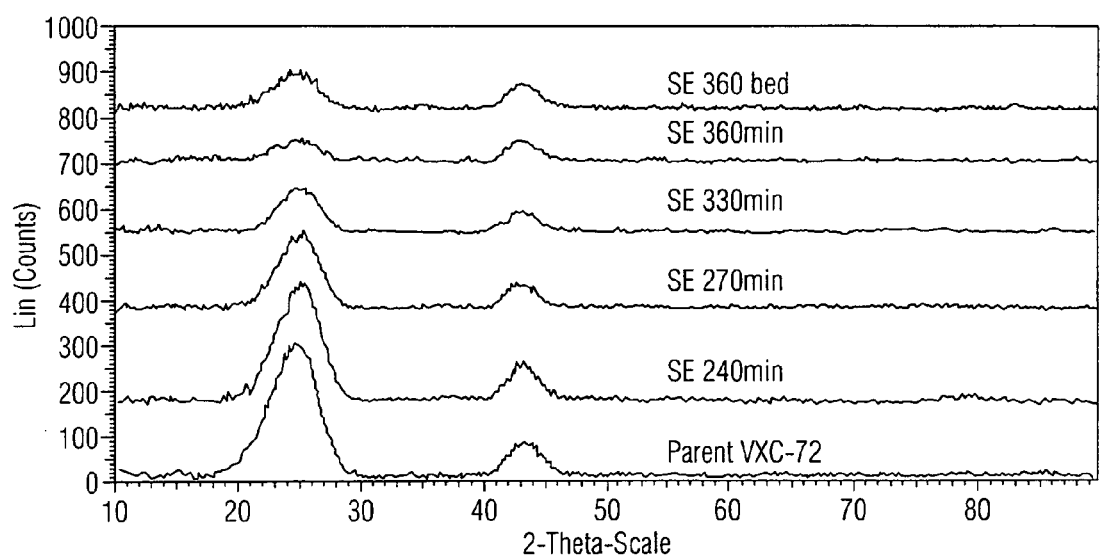
FIGS. 3A-3C present XRD profiles of steam etched carbon blacks as a function of etching time.
Figure 3B:
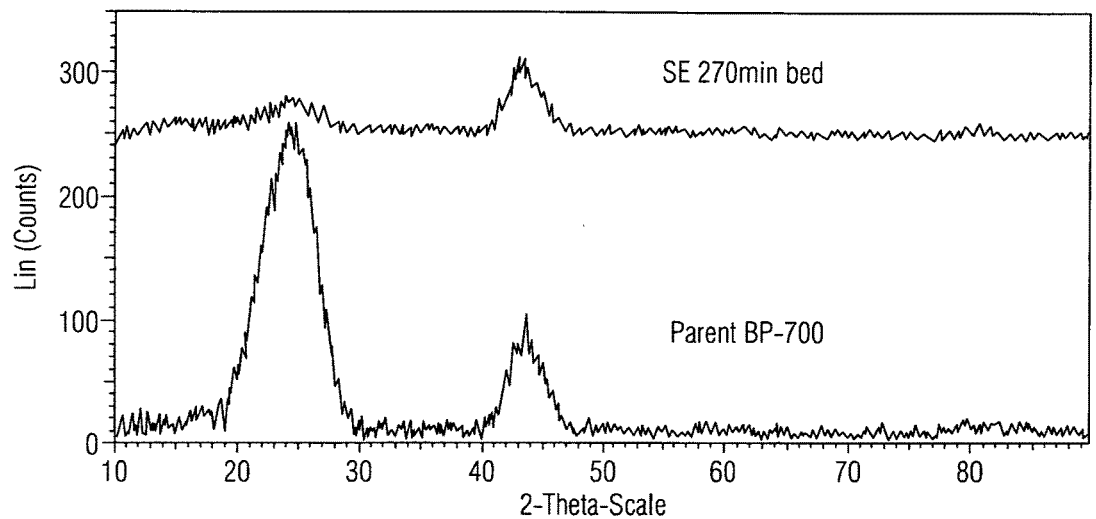
Figure 3C:
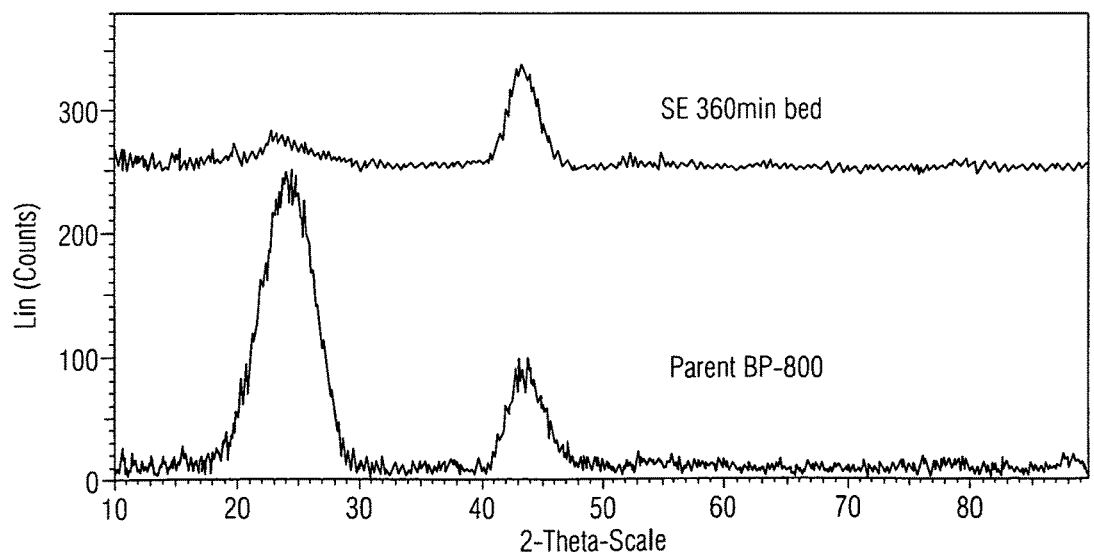
Figure 4:
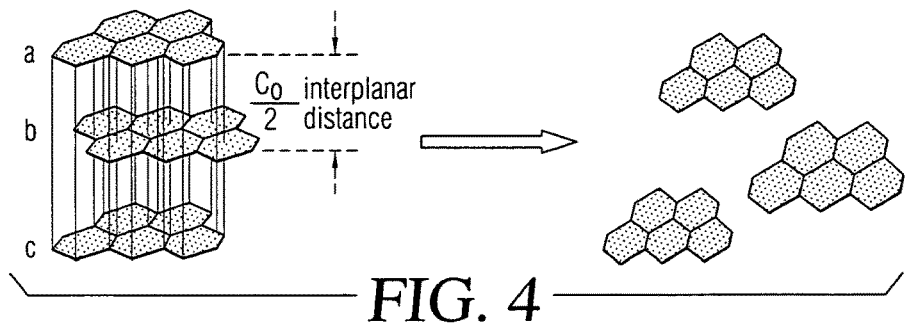
FIG. 4 illustrates a non-limiting possible change in carbon microstructure as steam etching progresses.

FIGS. 3A-3C present XRD patterns of steam etched carbon as a function of etching time. As shown, regardless of carbon type, the XRD peak at (002) was generally sensitive to steam etching. This sensitivity is reflected by the significant decrease in the peak intensity at peak (002) as steam etching progressed. In contrast, the intensity of the peak at (10) was minimally affected by the steam etching process. The peak at (002) reflects the three-dimensional order of carbon, while the peak at (10) is more related to layered planes. Without being bound by theory, these results suggest that the order of long range lattice orientation is destroyed during etching or that the layered planes become more disoriented as etching progresses, as illustrated in FIG. 4.

Figure 5A:
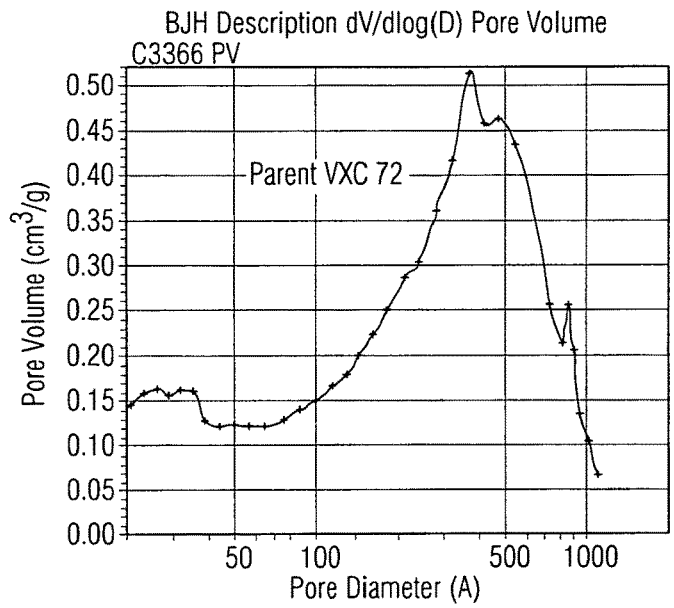
FIGS. 5A and 5B present pore size distributions for carbon black (Vulcan XC72) before (FIG. 5A) and after (FIG. 5B) steam etching at 950° C. for 360 minutes as per Example 4.
Figure 5B:
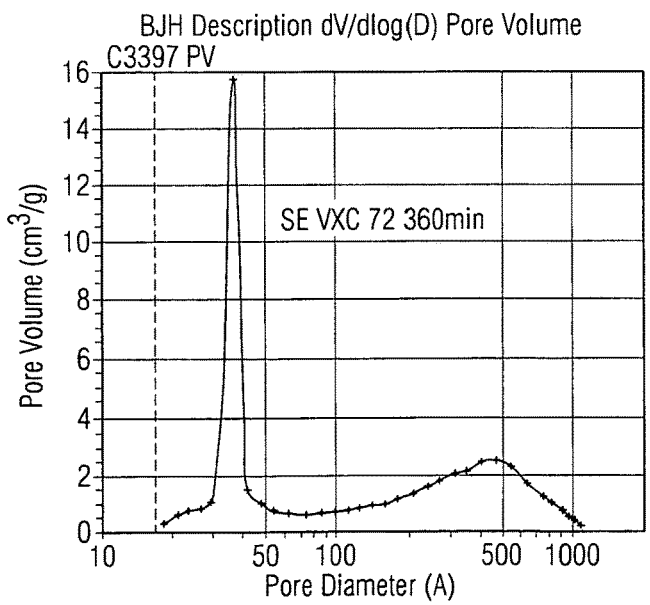

FIGS. 5A and 5B present pore size distributions for carbon black (Vulcan XC 72) before (FIG. 5A) and after (FIG. 5B) steam etching at 950° C. for 360 minutes as per Example 4 below. As shown, the maximum pore size of the parent (non-steam etched) carbon black was on the order of about 10 to about 100 nm. Since the primary particles were on the order of 14 nm, these pores are primarily interaggregate pores (e.g. pores formed between the aggregates). During steam etching, micro- and meso-pores were created by the removal of the carbon atoms from the particles. Most of the pores created by steam etching had an average pores size on the order of about 3 to about 5 nm, although a fraction of pores larger than 50 nm is also observed. This result has been confirmed with Hg porosimetry.

Carbon Black Product

In various additional embodiments, the invention is directed to carbon black product, preferably formed by any of the above-described processes. The various properties of the carbon black product will vary depending, for example, on the desired application, the oxidizing conditions, and on the physical properties of the carbon black starting material that is employed.

The average pellet size of the carbon black product will depend primarily on the pellet size of the carbon black starting material. For example, in various exemplary embodiments, the carbon black product, e.g., pelletized carbon black product, has an average pellet size greater than about 10 μm, e.g., greater than about 50 μm, greater than about 100 μm, greater than about 200 μm, greater than about 500 μm, or greater than about 1 mm. In terms of ranges, the carbon black product, e.g., pelletized carbon black product, has an average pellet size of from about 10 μm to about 5 mm, e.g., from about 100 μm to about 5 mm, or from about 200 μm to about 2 mm.

Since the carbon black starting material preferably is substantially free of carbon black fines, the carbon black product similarly is preferably substantially free of carbon black fines. Also, carbon black fines are not readily retained by the fluidized bed reactor. As a result, the carbon black product typically will have a lower fraction of carbon black fines than the carbon black starting material. In various optional embodiments, the carbon black product comprises less than about 5 weight percent carbon black fines, e.g., less than about 3 weight percent, or less than about 1 weight percent carbon black fines.

The second BET nitrogen surface area ($N_2SA$) of the carbon black product will vary primarily based on the oxidizing conditions employed and on the desired application for the carbon black product. In various optional embodiments, the second BET nitrogen surface area is greater than about 600 $m^2/g$, e.g., greater than about 900 $m^2/g$, greater than about 1000 $m^2/g$, greater than about 1200 $m^2/g$, or greater than about 1500 $m^2/g$. In terms of ranges, the second BET nitrogen surface area optionally is from about 600 $m^2/g$ to about 1800 $m^2/g$, e.g., from about 600 $m^2/g$ to about 900 $m^2/g$, from about 900 $m^2/g$ to about 1200 $m^2/g$, from about 1200 $m^2/g$ to about 1500 $m^2/g$, or from about 1500 $m^2/g$ to about 1800 $m^2/g$.

The average primary particle size ($D_p$) of the carbon black product may be slightly greater than the average primary particle size of the carbon black starting material, although the average primary particle sizes of the carbon black product and the carbon black starting material should generally correspond with one another. In some exemplary embodiments, the average primary particle size of the carbon black product is greater than the average primary particle size of the carbon black starting material by at least about 0.5 nm, e.g., at least about 1 nm, at least about 2 nm, at least about 3 nm or at least about 4 mm. Optionally, the carbon black product has an average primary particle size less than about 100 nm, e.g., less than about 75 nm, less than about 50 nm, less than about 30 nm, less than about 20 nm, or less than about 10 nm. In terms of ranges, the average primary particle size of the carbon black product optionally is from about 7 nm to about 100 mm, e.g., from about 5 to about 15 mm, from about 35 to about 80 nm, from about 10 to about 50 mm, from about 10 nm to about 40 mm, from about 10 nm to about 30 mm or from about 10 nm to about 20 mm.

Similarly, the average aggregate size ($D_{agg}$) of the carbon black product may be slightly greater than the average aggregate size of the carbon black starting material, although the average aggregate sizes of the carbon black product and the carbon black starting material should generally correspond with one another. In some exemplary embodiments, the average aggregate size of the carbon black product is greater than the average aggregate size of the carbon black starting material by at least about 10 mm, e.g., at least about 20 nm, at least about 30 nm, at least about 40 nm or at least about 50 mm. Optionally, the carbon black product has an average aggregate size that is less than about 500 nm, e.g., less than about 400 nm, less than about 300 nm, less than about 200 nm, or less than about 100 nm. In terms of ranges, the average aggregate size of the carbon black product optionally is from about 30 nm to about 500 nm, e.g., from about 50 to about 300 nm, or from about 100 nm to about 300 nm.

The carbon black product preferably has a similar structure to the carbon black starting material, as characterized by $D_{agg}/D_p$ ratio. In some exemplary embodiments, the carbon black product has a $D_{agg}/D_p$ ratio that is less than about 10, e.g., less than about 7, less than about 4, or less than about 2. In terms of ranges, the $D_{agg}/D_p$ ratio optionally is from about 1 to about 7, e.g., from about 1 to about 5, from about 1 to about 3, or from about 1 to about 2.

As indicated above, during the oxidizing process of the present invention, microporosity (and hence the BET nitrogen surface area/STSA ratio) may initially increase, but ultimately will decrease. Accordingly, as the process of the invention proceeds, the BET nitrogen surface area/STSA ratio will ultimately decrease and approach 1. In some preferred embodiments, the carbon black product has a BET nitrogen surface area/STSA ratio that is less than about 1.5, e.g., less than about 1.4, less than about 1.3, less than about 1.2, less than about 1.1, or less than about 1.05. In terms of ranges, the carbon black product optionally has a BET nitrogen surface area/STSA ratio of from about 0.95 to about 1.5, e.g., from about 0.95 to about 1.4, from about 0.95 to about 1.3, from about 0.95 to about 1.2, from about 0.95 to about 1.1, or from about 0.95 to about 1.05.

Although microporosity preferably decreases according to the process of the present invention, ideally the carbon black product of the present invention has a substantial degree of mesoporosity. In some exemplary embodiments, the carbon black product has a total volume of pores between about 2 and about 5 nm in size of from about 0.3 to about 2 cm$^3$/g, e.g., from about 0.5 to about 1.5 cm$^3$/g, from about 1.2 to about 2.0 cm$^3$/g, or from about 1 to about 1.5 cm$^3$/g, as measured by BJH nitrogen desorption. In another embodiment, the carbon black product has a total volume of pores between about 2 and about 100 nm in size of from about 1.0 to about 5.0 cm$^3$/g, e.g., from about 2.0 to about 4.0 cm$^3$/g, from about 3.0 to about 5.0, or from about 2.5 to about 4.0 cm$^3$/g, as measured by BJH nitrogen desorption. The BJH nitrogen desorption method of measuring pore size distributions and pore volumes is described in ASTM 4222-03 and ASTM 4641-94, the entireties of which are incorporated herein by reference, and was used for the pore size measurements described herein.

In some particularly preferred embodiments, the invention is directed to carbon black (preferably formed according to a process of the present invention) comprising certain combinations of physical characteristics not achievable through conventional gasification carbon black manufacturing processes.

For example, in one embodiment, the invention is to a porous carbon black having a BET nitrogen surface area of from about 600 to about 900 m$^2$/g (e.g., from about 600 to about 800 m$^2$/g, or from about 700 to about 800 m$^2$/g) and a BET nitrogen surface area:STSA ratio of from about 0.95 to about 1.1 (e.g., from about 0.95 to about 1.05).

In another embodiment, the invention is to a porous carbon black having a BET nitrogen surface area of from about 900 to about 1200 m$^2$/g (e.g., from about 900 to about 1100 m$^2$/g, or from about 1000 to about 1100 m$^2$/g) and a BET nitrogen surface area:STSA ratio of from about 0.95 to about 1.1 (e.g., from about 0.95 to about 1.05).

In another embodiment, the invention is to a porous carbon black having a BET nitrogen surface area of from about 1500 to about 1800 m$^2$/g (e.g., from about 1500 to about 1700 m$^2$/g, or from about 1600 to about 1700 m$^2$/g) and a BET nitrogen surface area:STSA ratio of from about 0.95 to about 1.1. (e.g., from about 0.95 to about 1.05).

In another embodiment, the invention is to a porous carbon black having an average primary particle size of from about 35 to about 80 nm, a BET nitrogen surface area of from about 600 to about 1800 m$^2$/g (e.g., from about 800 to about 1500 m$^2$/g, or from about 800 to about 1300 m$^2$/g), and a BET nitrogen surface area:STSA ratio of from about 0.95 to about 1.1 (e.g., from about 0.95 to about 1.05).

In another embodiment, the invention is to a porous carbon black having a BET nitrogen surface area of from about 600 to about 1800 m$^2$/g (e.g., from about 800 to about 1500 m$^2$/g, or from about 800 to about 1300 m$^2$/g), and a $D_{agg}/D_p$ ratio of from about 1 to about 7, e.g., from about 1 to about 5, from about 1 to about 3 or from about 1 to about 2.

In another embodiment, the invention is to a porous carbon black having a BET nitrogen surface area of from about 900 to about 1400 m$^2$/g (e.g., from about 900 to about 1200 m$^2$/g, or from about 1000 to about 1200 m$^2$/g) and a $D_{agg}/D_p$ ratio of from about 1 to about 5 (e.g., from about 1 to about 3 or from about 1 to about 2).

Applications for Carbon Black Product

The carbon black product of the present invention may be used in many applications. For example, the carbon black product may be used in forming conductive plastics, inkjet inks, catalyst supports (e.g., for fuel cell catalysts), fuel cell electrodes, and in supercapacitors. Accordingly, the invention is also directed to conductive plastics, inkjet inks, catalyst supports (e.g., for fuel cell catalysts), and supercapacitors that are formed from the carbon black product. Of course these applications are non-limiting examples, and other applications are possible.

In a first application, the carbon black product is used in forming conductive plastics. Carbon black is highly electrically conductive and is therefore added to (normally nonconductive) plastics at sufficient levels to achieve a percolating network of carbon black, thereby resulting in the plastic part or film becoming electrically conductive. Generally, achieving electrical percolation at lower mass loadings of carbon black can be advantageous in that it can impart other advantages to the plastic, such as viscosity, fracture toughness, adhesion, density, or other properties. High porosity carbons have been used in conductive applications (with the intent to achieve percolation at low mass loadings) where the objective was to increase the porosity of high OAN carbons without specific focus on the size of the pores. For example, EP 0175327 B1, the entirety of which is incorporated herein by reference, describes injection of species into the furnace reactor to increase the (porous) surface area of conductive carbon black. EP 1453898 B1, the entirety of which is incorporated herein by reference, describes the use of highly etched (high surface area) carbon black and its benefit in conductive polyolefins. U.S. Pat. No. 5,171,774, the entirety of which is incorporated herein by reference, describes the use of highly etched carbon black in crystalline polymer compositions for improving the positive temperature coefficient of resistance.

In another embodiment, the carbon black product is incorporated into an ink jet ink. In this aspect, the ink preferably comprises a liquid vehicle (e.g., dispersing agent) and the carbon black product, and has surface tension and viscosity characteristics that render it suitable for ink jet printing. Due to their high surface area and relatively low density, the carbon black product of the present invention are particularly well suited for the formation of ink jet inks have surprising and unexpectedly high degree of stability. The lower density results in less settling force, while the preserved overall morphology maintains similar drag forces and the same (or possibly improved) optical density. Thus, oxidized, e.g., steam etched, carbon black product according to the present invention allows for an improved trade off between optical density and dispersion stability.

In another embodiment, the invention is to catalyst particles comprising a carbon black product formed according to any of the above-described processes of the invention and further comprising an active phase disposed on the carbon black product, which acts as a support phase for the active phase.

Many processes are known for forming catalyst particles comprising a carbon black support phase and an active phase disposed thereon. In a preferred embodiment, the catalyst particles are formed in a spray conversion reactor. In this embodiment, a liquid mixture is formed comprising carbon support particles, i.e., any of the above-described mesoporous carbon black products, an active phase precursor, and a liquid vehicle. The liquid mixture is sprayed at elevated temperatures under conditions effective to vaporize the liquid vehicle and convert the active phase precursor to active phase disposed on the carbon support particles. Optionally, the active phase comprises platinum, ruthenium, platinum and ruthenium, or a platinum alloy. Such processes are described, for example, in U.S. patent application Ser. No. 11/328,147, filed Jan. 10, 2006, the entirety of which is incorporated herein by reference.

In a particularly preferred embodiment, the invention is to a process for forming catalyst particles, the process comprising the steps of: (a) providing a precursor medium comprising a first metal precursor, a liquid vehicle, and a substrate precursor comprising any of the above-described carbon black products (e.g., mesoporous carbon black); (b) spray converting, e.g., drying, the precursor medium to vaporize at least a portion of the liquid vehicle and form intermediate particles; and optionally (c) heating the intermediate particles to a temperature effective (e.g., from about 250 to about 750° C.) to form catalyst particles comprising an active phase (preferably comprising active phase nanoparticles, e.g., particles having an average particle size of less than about 25 nm, e.g., less than about 10 nm, less than about 8 nm, less than about 5 nm, or less than about 3 nm) disposed on the carbon black product. For some metal precursors, e.g., some platinum precursors, the active phase may be fully formed in the spray converting step and the subsequent heating step (step (c), above) is not needed. The precursor medium, may comprise one or more additional metal precursors if, for example, it is desired to form an alloy active phase on the porous, e.g., mesoporous, carbon. Of course, in other embodiments, well-known wet precipitation processes may be employed for forming catalyst particles on the carbon black product. See, e.g., U.S. Pat. No. 5,068,161, the entirety of which is incorporate herein by reference.

The active phase may vary widely. In a preferred embodiment, the active phase comprises platinum or any other of the noble metals, as these materials are most active and best able to withstand the corrosive environment of fuel cells. In another embodiment, the active phase comprises one or more alloys, e.g., alloys of noble metals. Some exemplary catalytic alloys are disclosed, for example, in U.S. Pat. No. 4,186,110 (Pt—Ti, Pt—Al, Pt—Al—Si, Pl-Sr—Ti, Pt—Ce), in U.S. Pat. No. 4,316,944 (Pt—Cr) and U.S. Pat. No. 4,202,934 (Pt—V), the entireties of which are incorporated herein by reference.

Additionally, in some embodiments, the invention is directed to electrodes, particularly electrodes for fuel cells such as direct methanol fuel cells (DMFC) or hydrogen fuel cells, comprising the above-described catalyst particles, as well as to processes for forming such electrodes. Mesoporous carbon black particles are highly desirable for fuel cell applications in that they allow mass transfer across the entire surface area of the particles, thereby enabling both the deposition of the platinum or platinum alloy catalyst particles and the transfer of ions and species for efficient fuel cell operation. (See, e.g., U.S. patent application Ser. No. 11/756,997, filed Jun. 1, 2007, the entirety of which is incorporated herein by reference, which discloses Pt/Ru alloy catalyst particles disposed on carbon substrate particles.) In a preferred embodiment, the above described catalyst particles are formulated into an ink, which is deposited onto carbon cloth or carbon paper or directly on a membrane (e.g., a polymer electrolyte membrane (PEM), such as a Nafion membrane) to form an electrode. The depositing step may be accomplished by spray deposition. Alternatively, the deposition of a catalyst particles according to the present invention can be carried out, for example, by pen/syringe, continuous or drop on demand ink-jet, droplet deposition, spraying, flexographic printing, lithographic printing, gravure printing, other intaglio printing, and others. See, e.g., U.S. Patent Publication No. 2004/0038808, filed Apr. 16, 2003, the entirety of which is incorporated herein by reference, which discloses processes for printing catalyst-containing inks onto PEM's using direct write printing processes such as ink jet printing.

Processes for forming electrodes and membrane electrode assemblies in spray deposition processes from inks comprising catalyst particles are fully disclosed in copending U.S. patent application Ser. No. 11/534,561 filed Sep. 22, 2006 and Ser. No. 11/679,758 filed Feb. 27, 2007, the entireties of which are incorporated herein by reference.

In another embodiment, the carbon black product is used in forming electrodes for electric double layer capacitors, also known as supercapacitors. Supercapacitors utilize high surface area carbons (e.g., Black Pearls (BP) 2000) with specific pore sizes. In this aspect of the invention, the carbon black product has high surface area and atypical morphology (e.g., low starting OAN or $D_{agg}/D_p$, e.g., Regal 250, Regal 350, etc.) and that enhances supercapacitor performance. The morphological differences enhance the supercapacitor performance because the new materials provide higher volumetric capacitance, as the final bulk packed density of the carbon black in the electrode is higher than with conventional carbon blacks. The industry currently uses aerogels or activated carbons as alternatives to or in addition to carbon black, primarily because of the higher surface area per unit volume that can be achieved when packing these materials. For example, U.S. Pat. No. 7,160,615, the entirety of which is incorporated herein by reference, describes a manufacturing method for the formation of electrodes for electric double layer capacitors incorporating activated carbons, and carbon blacks as conductivity enhancers. U.S. Pat. No. 5,260,855, the entirety of which is incorporated herein by reference, describes the use of carbon foams or aerogels for the formation of the electrodes of electric double layer capacitors having higher specific capacitance. The current invention would enable the use of carbon black alone to achieve comparable or better performance.

Surface modification of these new carbonaceous materials may provide additional methods to enhance capacitance. This can be accomplished, for example, using diazonium, oxidation, heat treatment or other techniques to attach functional groups to the porous carbon black particles. Surface modification methods include the methods described in U.S. Pat. Nos. 5,554,739, 5,707,432, 5,837,045, 5,851,280, 5,885,335, 5,895,522, 5,900,029, 5,922,118, and 6,042,643, and PCT Publication WO 99/23174, the entireties of which are incorporated herein by reference. Such methods provide for a more stable attachment of the groups onto pigments or carbonaceous materials as compared to dispersant type methods, which use, for example, polymers and/or surfactants. With respect to oxidation, the carbonaceous material may also be oxidized an oxidizing agent in order to introduce ionic and/or ionizable groups onto the surface. Carbonaceous materials prepared in this way have been found to have a higher degree of oxygen-containing groups on the surface. Oxidizing agents include, but are not limited to, oxygen gas, ozone, $NO_2$ (including mixtures of $NO_2$ and air), peroxides such as hydrogen peroxide, persulfates, including sodium, potassium, or ammonium persulfate, hypohalites such a sodium hypochlorite, halites, halates, or perhalates (such as sodium chlorite, sodium chlorate, or sodium perchlorate), oxidizing acids such a nitric acid, and transition metal containing oxidants, such as permanganate salts, osmium tetroxide, chromium oxides, or ceric ammonium nitrate. Mixtures of oxidants may also be used, particularly mixtures of gaseous oxidants such as oxygen and ozone. In addition, carbonaceous materials prepared using other surface modification methods to introduce ionic or ionizable groups onto a carbonaceous material surface, such as chlorination and sulfonylation, may also be used.

While not wishing to be bound to any theory, if hydrophilic function groups are attached via one of the surface modification processes, the charge separation on the double layer interface between the solid particles and the liquid electrolyte in the pores could be increased, thereby increasing the energy storage capacity. In addition, attachment of hydrophilic groups could improve the wetting of the pores, helping the electrolyte to fully wet the porous structure and form and conducting path throughout the porous carbon black. Heat treatment could be used to remove specific functional groups that could cause degradation of the capacitance over time.

Examples

The present invention will be better understood in view of the following non-limiting examples.

Six carbon black starting materials (selected from four different commercial carbon blacks) were steam etched in a pilot-scale fluidized bed reaction system substantially similar to the one discussed above with respect to FIG. 2. The ideal fluidization velocity of each carbon black starting material was evaluated with air at room temperature in a bench-scale fluidization device. The initial charge of each carbon black starting material was loaded into the fluidized bed so that it sat on top of the bottom plate. The bed was then sealed and a flow of nitrogen was passed through the carbon black, entering through the bottom plenum, passing through the bottom plate and then the carbon black, and then finally exiting through the top of the fluidized bed reactor. Electrical heaters were activated to bring the bed temperature up to the run temperature shown in Table 1, below. The nitrogen flow was then stopped and the oxidant stream (pure steam in all six examples) with a superficial velocity roughly equal to the ideal fluidization velocity was turned on and the run was initiated. Samples were pulled regularly from the bed using a dip pipe and measured to track the progress of the carbon black etching. At the end of the run time shown in Table 1, the oxidant flow was switched off along with the electrical heaters, and nitrogen was again passed to the fluidized bed while it cooled down to room temperature. The final bed product was then collected from the bottom of the fluidized bed reactor. In all runs, some carbon black was lost to the fines collection system; this was material that was entrained with the fluidization gases that left the top of the reactor.

TABLE 1

| | Fluidized Bed Operating Parameters | | | | | |
|---|---|---|---|---|---|---|
| Example No. | 1 | 2 | 3 | 4 | 5 | 6* |
| Carbon Black Starting Material | Vulcan XC72 (w/ binder) | Black Pearls 700 | Black Pearls 800 | Vulcan XC72 (w/ binder) | Vulcan XC605 | Vulcan XC72 |
| Initial $D_p$ ASTM (nm) | 14.0 | 12.7 | 12.1 | 14.0 | 36.4 | 14.0 |
| Initial $D_{agg}$ (nm) | 125 | 84.7 | 59.4 | 125 | 278 | 125 |

TABLE 1-continued

Fluidized Bed Operating Parameters

| Example No. | 1 | 2 | 3 | 4 | 5 | 6* |
|---|---|---|---|---|---|---|
| Initial $D_{agg}/D_p$ | 8.9 | 6.7 | 4.9 | 8.9 | 7.6 | 8.9 |
| Initial Bulk Density (kg/m$^3$) | 272 | 304 | 432 | 272 | 272 | 184 |
| Measured Fluidization Velocity (m/s) | 0.102 | 0.056 | 0.056 | 0.102 | 0.102 | 0.102 |
| Fluidization Gas | Steam | Steam | Steam | Steam | Steam | Steam |
| Initial CB Charge (kg) | 21.8 | 12.0 | 16.8 | 21.8 | 21.8 | 21.8 |
| Bed Temp (° C.) | 950 | 950 | 950 | 950 | 950 | 1025 |
| Steam Bed Velocity (m/s) | 0.102 | 0.056 | 0.056 | 0.102 | 0.102 | 0.098* |
| Steam Flow Rate (kg/hr) | 6.51 | 3.58 | 3.58 | 6.51 | 6.51 | 5.92* |
| Steam: Carbon (kg/kg/hr) | 0.30 | 0.30 | 0.21 | 0.30 | 0.30 | 0.27* |
| Reaction Time (hr) | 4.1 | 4.5 | 6.0 | 6.0 | 6.0 | 7.4 |

*Example 6 was performed with a bottom plate that provided poor fluidization, leading to a slower reaction rate.

The operating parameters described in Table 1 were used to produce steam-etched carbon black products having the material properties shown in Table 2. It can be seen that the average primary particle diameter and the average aggregate diameter (as measured by TEM) stayed approximately the same or increased slightly during the etching process.

TABLE 2

Carbon Black Product Properties

| Example No. | 1 | 2 | 3 | 4 | 5 | 6* |
|---|---|---|---|---|---|---|
| $D_p$ ASTM (nm) | 18.3 | Not Analyzed | 10.7 | 17.3 | Not Analyzed | 14.5 |
| $D_{agg}$ (nm) | 139 | Not Analyzed | 59.9 | 165 | Not Analyzed | 143 |
| $D_{agg}/Dp$ | 7.6 | Not Analyzed | 5.6 | 9.5 | Not Analyzed | 9.9 |
| $N_2$SA (m$^2$/g) | 885 | 1643 | 1627 | 1484 | 1010 | 897 |
| STSA (m$^2$/g) | 820 | 1679 | 1601 | 1428 | 998 | 851 |
| $N_2$SA/STSA | 1.08 | 0.98 | 1.02 | 1.04 | 1.01 | 1.05 |
| Pore Volume 2 < D < 100 nm (cm$^3$/g) | 1.42 | 3.81 | 2.84 | 3.13 | 1.56 | Not Analyzed |
| Pore Volume 2 < D < 5 nm (cm$^3$/g) | 0.64 | 1.03 | 1.15 | 1.37 | 0.86 | Not Analyzed |

Table 3 shows comparative carbon blacks produced by processes other than gaseous oxidative etching in a fluidized bed.

TABLE 3

Comparative Mesoporous Carbon Blacks

| Example No. | C1 | C2 | C3 |
|---|---|---|---|
| Commercial Name | Ketjen EC600 | Printex XE-2 | Black Pearls 2000 |
| $D_p$ ASTM (nm) | 12.8 | 24.0 | 9.7 |
| $D_{agg}$ (nm) | 129 | 173 | 87.4 |
| $D_{agg}/D_p$ | 10.1 | 7.2 | 9.0 |
| N2SA (m$^2$/g) | 1443 | 953 | 1553 |
| STSA (m$^2$/g) | 1407 | 802 | 663 |
| N2SA/STSA | 1.03 | 1.19 | 2.34 |
| Pore Volume 2 < D < 100 nm (cm$^3$/g) | 2.89 | Unknown | Unknown |
| Pore Volume 2 < D < 5 nm (cm$^3$/g) | 1.01 | Unknown | Unknown |

Figure 6:
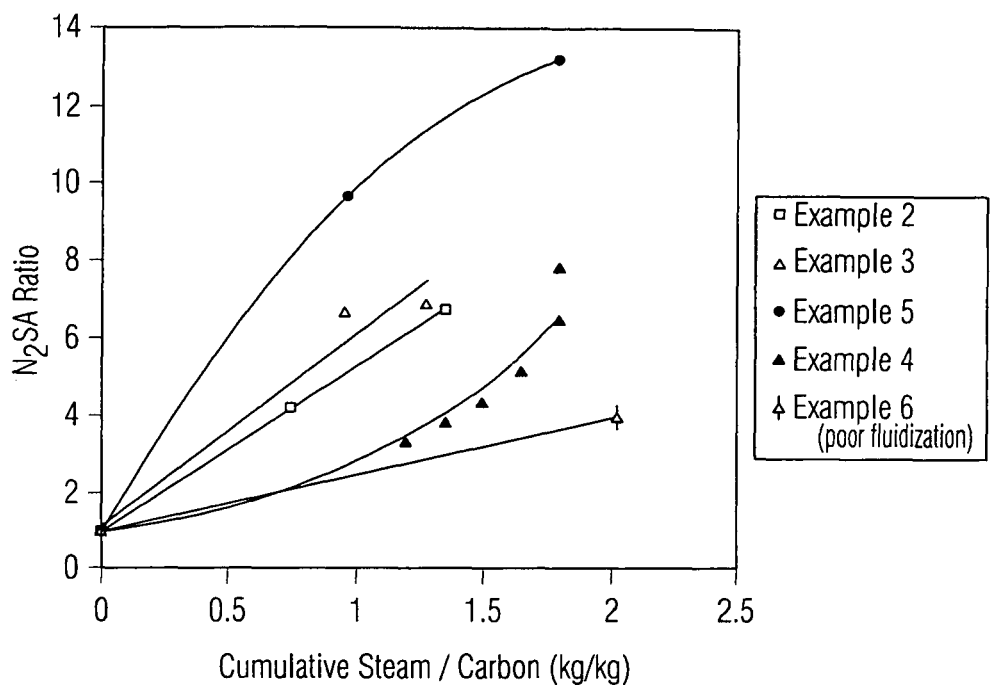
FIG. 6 is a graph illustrating the change in BET nitrogen surface area for carbon blacks etched as per Examples 2-6 as a function of cumulative steam/carbon (kg/kg)

As indicated above in Table 1, the steam:carbon ratio (having units of kg steam/(kg carbon/hr)) can be adjusted to control the rate of etching. Given that the fluidization velocity is more or less set by the material properties of the carbon black, the steam to carbon ratio can be practically adjusted by changing the ratio of steam to inert gas (typically nitrogen) in the oxidant gas, or by changing the initial carbon black charge to the bed. To a rough approximation, it has been discovered that at constant steam to carbon ratio, the etching reaction, as measured by the relative increase in surface area, proceeds at a roughly similar rate for different carbon blacks. This is illustrated by the plot in FIG. 6. In practice, the fluidized bed reactor is controlled by selecting a bed temperature and steam:carbon ratio to achieve a desired etching reaction rate, and then running the reactor for a fixed time period to achieve the desired etching level, as measured by surface area or other tests. It was observed that if the fluidization in the bed is poor (for example, by running below the critical fluidization velocity or by using a poor fluidizing plate that does not distribute the gases well) as in Example 6, the etching rate drops significantly (see FIG. 6). This is further proof of the importance of conducting the oxidative etching in a fluidized bed reactor with efficient gas-solid contacting.

Figure 7:
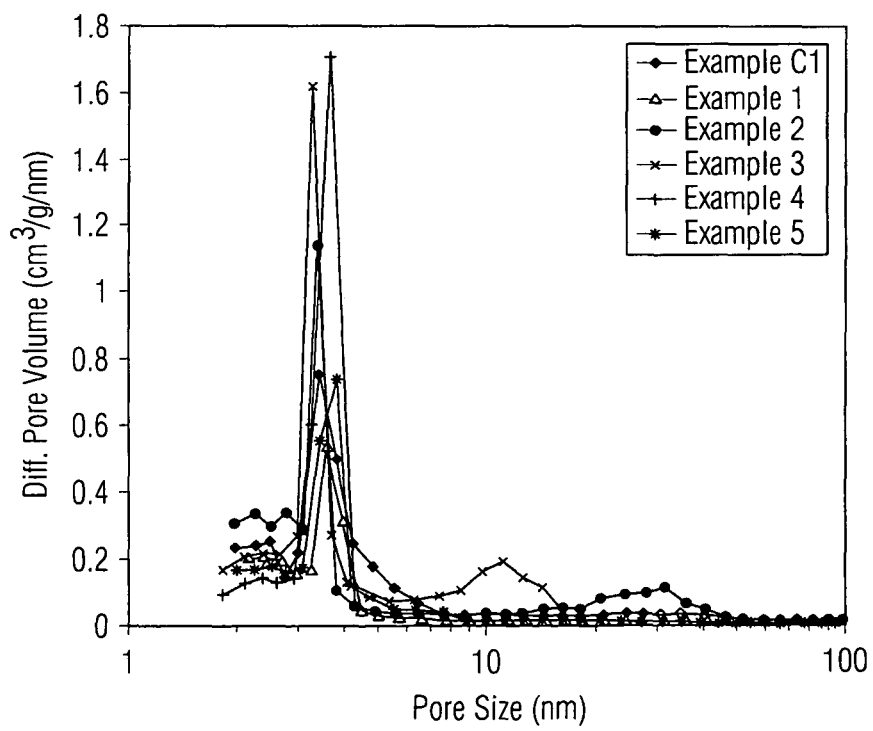
FIG. 7 is a graph illustrating differential pore volume for Example C1 and Examples 1-5 as a function of pore size.

The examples further illustrate that etching a carbon black starting material with steam and steam/nitrogen mixtures in a fluidized bed reactor can form carbon black product having a significant degree of mesoporosity. FIG. 7 shows pore size distributions of carbon black products (Examples 1-5) made via this process, as measured via nitrogen desorption isotherms. All of the carbon black products presented in FIG. 7 have nitrogen surface areas between 800-1700 m$^2$/g. The etching time and fluidized bed conditions varied as per the examples above. For all steam-etched examples, there appeared to be a characteristic peak in the pore size distribution between 3 and 5 nm in diameter, which is similar to materials made via gasification processes (e.g., Ketjen EC600) which is also shown in FIG. 7 as Example C1. Steam etched carbon blacks BP700 and BP800 (Examples 2 and 3) show a significant secondary peak around 10 and 30 nm, respectively, which is possibly due to interaggregate porosity. The examples present novel processes for forming heretofore unknown carbon blacks that are highly mesoporous with smaller aggregate sizes and lower structure as characterized by $D_{agg}/D_p$. Also, the level of mesoporosity (characterized by the volume of 2-5 nm pores) achieved for several of the examples (e.g. examples 2, 3, and 4) is higher than that of Ketjen EC600 (example C1).

Figure 8:
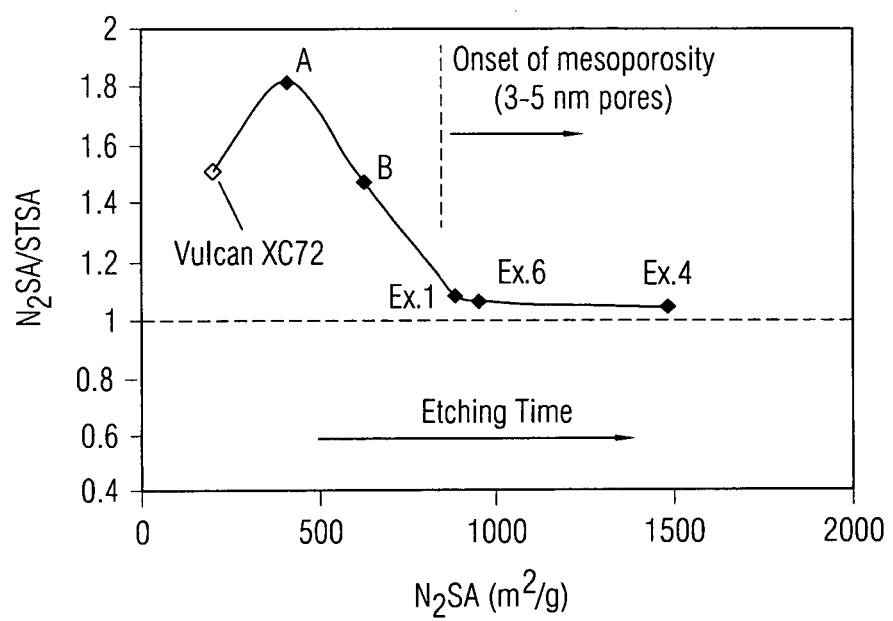
FIG. 8 is a graph illustrating the change in BET nitrogen surface area/STSA surface area as a function of BET nitrogen surface area for Examples 1, 4 and 6.

Unlike the steam etched carbon blacks included in FIG. 7, highly etched carbon blacks such as Black Pearls 2000 (example C3), where the etching is done in situ in the furnace reactor, do not show a large peak in the 2-5 nm range because the porosity is primarily micropores (having a BET nitrogen surface area/STSA ratio of 1.5-2.5). In contrast, highly mesoporous carbon black product manufactured according to the present invention has a peak in the 2-5 nm range and typically had a BET nitrogen surface area/STSA ratio of about 1. By tracking the change in the BET nitrogen surface area/STSA ratio that occurs during steam etching in the fluidized bed, the reaction time can be controlled to ensure that mesoporous carbon black product is formed. This is shown in FIG. 8, which illustrates how the pore structure of Vulcan XC72 changes during the oxidizing process of the invention. Initially, Vulcan XC72 comprises micropores as the BET nitrogen surface area/STSA ratio is about 1.5 with an BET nitrogen surface area of about 225 m$^2$/g. As the material is etched in a fluidized bed reactor, the BET nitrogen surface area increases continuously. However, the BET nitrogen surface area/STSA ratio initially increases, as additional microporosity is created, but then starts to decrease and approaches 1 as the pores become larger and the microporous structure is destroyed. This is evidenced by the fact that samples A and B in FIG. 8 do not have a peak in the 3-5 nm pore size range, whereas Examples 1, 4, and 6 in FIG. 8 do show the 3-5 nm peak in the pore size distribution that is associated with intraparticle mesoporosity. The appropriate total surface area, pore volume, and pore size can therefore be controlled by controlling the temperature, steam:carbon ratio, and time in the bed.

It is noted that the foregoing examples have been provided merely for the purpose of explanation and are in no way to be construed as limiting of the present invention. While the present invention has been described with reference to various exemplary embodiments, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

We claim:

1. A process for increasing carbon black surface area, comprising contacting a carbon black starting material having a first BET nitrogen surface area with an oxidant in a fluidized bed under conditions effective to form a carbon black product having a second BET nitrogen surface area greater than the first BET nitrogen surface area, wherein the carbon black product has (i) a BET nitrogen surface area of from 600 to about 1200 m$^2$/g or from about 1500 to about 1800 m$^2$/g, and (ii) a BET nitrogen surface area:STSA ratio of from 0.95 to 1.1.

2. The process of claim 1, further comprising fluidizing the carbon black starting material in the fluidized bed with a fluidizing agent comprising the oxidant.

3. The process of claim 2, wherein the oxidant comprises steam.

4. The process of claim 2, wherein the oxidant comprises carbon dioxide.

5. The process of claim 3, wherein the fluidizing agent further comprises an inert gas.

6. The process of claim 5, wherein the inert gas comprises nitrogen or argon.

7. The process of claim 2, wherein the fluidizing agent consists essentially of steam.

8. The process of claim 2, wherein the carbon black starting material comprises pelletized carbon black.

9. The process of claim 2, wherein the conditions comprise a reaction time of from about 0.5 to about 15 hours.

10. The process of claim 9, wherein the mass ratio of cumulative oxidant at the end of the reaction time to carbon black starting material is from about 0.5 to about 2.5.

11. The process of claim 2, wherein the conditions comprise a fluidized bed temperature of from about 700° C. to about 1300° C.

12. The process of claim 2, wherein the conditions comprise a fluidized bed temperature of from about 900° C. to about 1100° C.

13. The process of claim 2, wherein the ratio of steam flow to carbon black starting material in the fluidized bed is from about 0.05 to about 0.50 kg steam/kg carbon black starting material/hour.

14. The process of claim 2, wherein the fluidizing agent has a superficial velocity in the fluidized bed of from about 0.03 to about 0.15 m/s.

15. The process of claim 2, wherein the second BET nitrogen surface area is greater than the first BET nitrogen surface area by a factor of at least about 1.5.

16. The process of claim 2, wherein the second BET nitrogen surface area is greater than the first BET nitrogen surface area by a factor of from about 1.5 to about 8.0.

17. Porous carbon having (i) a BET nitrogen surface area of from about 600 to about 1200 m$^2$/g or from about 1500 to about 1800 m$^2$/g, and (ii) a BET nitrogen surface area:STSA ratio of from 0.95 to 1.1.

18. The porous carbon black of claim 17, wherein the BET nitrogen surface area is from about 600 to about 900 m$^2$/g.

19. The porous carbon black of claim 17, wherein the BET nitrogen surface area is from about 900 to about 1200 m$^2$/g.

20. The porous carbon black of claim 17, wherein the BET nitrogen surface area is from about 1500 to about 1800 m$^2$/g.

21. A conductive plastic comprising the carbon black of claim 17.

22. An ink jet ink comprising the carbon black of claim 17.

23. A fuel cell catalyst comprising the carbon black of claim 17.

24. A supercapacitor comprising the carbon black of claim 17.

25. Porous carbon black having an average primary particle size of from about 35 to about 80 nm, a BET nitrogen surface area of from about 600 to about 1800 m$^2$/g, a total volume of pores between 2 and 100 nm in size of from about 3.0 to about 5.0 cm$^3$/g as measured by nitrogen desorption and a BET nitrogen surface area:STSA ratio of from 0.95 to 1.1.

26. The porous carbon black of claim 25, having a Dagg/Dp ratio of from about 1 to about 7.

27. The porous carbon black of claim 26, wherein the $D_{agg}$/Dp ratio is from about 1 to about 5.

28. The porous carbon black of claim 27, wherein D$_p$ is from about 35 to about 80 nm.

29. The porous carbon black of claim 27, wherein D$_p$ is from about 5 to about 15 nm.

30. The porous carbon black of claim 26, wherein the $D_{agg}$/Dp ratio is from about 1 to about 3.

31. The porous carbon black of claim 30, wherein D$_p$ is from about 35 to about 80.

32. The porous carbon black of claim 30, wherein D$_p$ is from about 5 to about 15 nm.

33. The porous carbon black of claim 26, wherein the porous carbon black has a BET nitrogen surface area of from about 900 to about 1400 m$^2$/g and a $D_{agg}$/D$_p$ ratio of from about 1 to about 5.

34. The porous carbon black of claim 33, wherein the $D_{agg}$/Dp ratio is from about 1 to about 3.

\* \* \* \* \*